A. H. COWLES.
METHOD OF MAKING ALKALI SILICO ALUMINATE.
APPLICATION FILED DEC. 24, 1912.

1,123,693.

Patented Jan. 5, 1915.

WITNESSES:
René Bruine
Gustave R. Thompson

INVENTOR
A. H. Cowles
By Attorney
Albert Stetson

UNITED STATES PATENT OFFICE.

ALFRED HUTCHINSON COWLES, OF SEWAREN, NEW JERSEY, ASSIGNOR TO THE ELECTRIC SMELTING AND ALUMINUM COMPANY, OF SEWAREN, NEW JERSEY.

METHOD OF MAKING ALKALI-SILICO-ALUMINATE.

1,123,693.  Specification of Letters Patent.  Patented Jan. 5, 1915.

Application filed December 24, 1912. Serial No. 738,455.

*To all whom it may concern:*

Be it known that I, ALFRED H. COWLES, a citizen of the United States, and a resident of Sewaren, in the county of Middlesex and State of New Jersey, have invented certain new and useful Methods for Making Alkali-Silico-Aluminate, of which the following is a specification.

My invention relates to a method for making alkali-silico-aluminate, richer in alkali than feldspar.

To carry out my invention, I subject either in a rotary, or other form of chamber furnace, finely pulverulent clay or potash feldspar, or feldspar mixed with clay or bauxite, either dry or not, to the vapors of salt and water.

I have found that the rapidity of conversion of clay into alkali-silico-aluminate in an atmosphere of vapor of salt and vapor of water or in contact with salt and vapor of water is dependent upon the amount of surface that is exposed to the salt and vapor of water. This conversion occurs almost instantly when finely ground feldspar or clay, freed from uncombined water is reduced to its dust form. There takes place the following reaction, which, for pure clay, is typical of the process:—

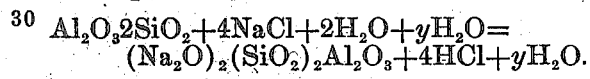

$$Al_2O_3 2SiO_2 + 4NaCl + 2H_2O + yH_2O = (Na_2O)_2(SiO_2)_2 Al_2O_3 + 4HCl + yH_2O.$$

From this it will be seen that the hydrochloric acid (4HCl) must have sufficient water, $2H_2O$ and ($yH_2O$) either from the admission of steam, or from the combustion gases to give the requisite amount of water in the vapors to furnish sufficient water for the full reaction and to materially aid in the condensation of the HCl produced. This quantity of water will vary according to the design of the hydrochloric acid condensing system and amount of water that may be admitted as water to coke towers.

My process may be carried on in various types of furnace, if connected with the furnace there be a dust condensing system, so that all dust formed, which is mostly condensed vapor of salt, may either fall back, or be conveyed back into the chamber into which salt, silico-aluminous material and steam are blown with highly heated combustion gases.

Figure 1:
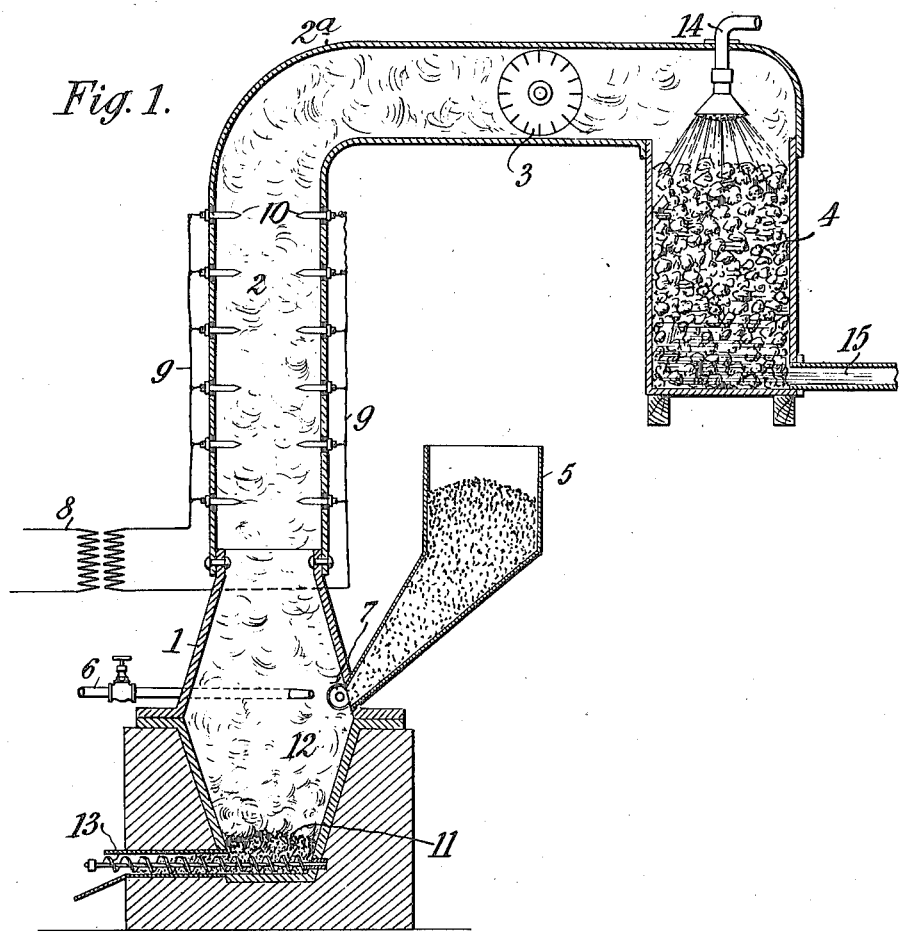
Figure 2:
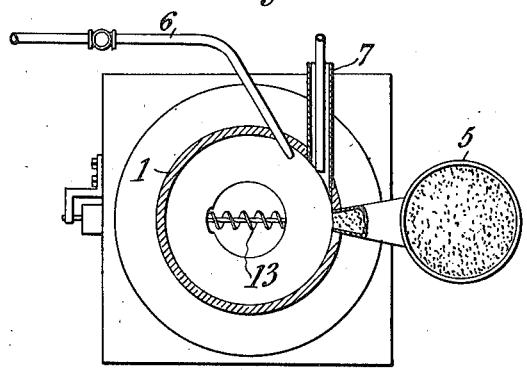

In the drawings I have shown one form of furnace in which my process can be carried out, and in these drawings, Figure 1 is a vertical section, and Fig. 2 a plan, partly in section of the furnace employed.

Referring to the drawings: 1 is a furnace body shown as formed of two truncated cones placed base to base: 2 is a dust chamber; 2ª is a flue pipe in which is located a suction blower 3 for conveying the gases and some dust to the scrubber 4; 5 is the hopper through which the aluminous material and salt mixture is fed to the furnace 1; 6 is the steam inlet pipe; 7 is the inlet for the combustion gases; 8 is a source of high potential electricity, which may be alternating or direct, connected by conductors 9 to the discharge point 10; 11 is a mass of coarse material and salt and 12 an atmosphere of vapor of salt; 13 is a worm, or other suitable conveyer for handling the mass 11; 14 is an acid sprinkler, for spraying acid into the scrubber 4, for assisting the condensation of the hydrochloric acid, and 15 is a pipe leading from the scrubber 4 to any suitable hydrochloric acid condensing system.

The operation of this form of furnace in carrying out my process is as follows: The salt mixed with the aluminous material in small masses or as a fine dry dust, preferably not heated high enough to drive off its chemically combined water, is fed through the hopper 5 into the furnace. It is there met by the flame gases and vapor of water. The two pipes, that for the gases and the one for steam may enter the furnace chamber at practically a tangent to the inner circumference thereof, whereby a whirling motion is imparted to the charge. The suction of the fan 3 draws the whirling charge up into the dust chamber, where it is electrified by the passage of electricity between the highly charged points 10, and according to the process set forth by Cottrell and others, the dust particles attract each other into small masses and fall back or are carried back into the furnace, the hydrochloric acid being sent to the acid condensing system for condensation.

It is essential that the walls of the chamber shall be made of material not easily fluxed by soda or potash. An aluminous brick made from bauxite, or a brick made from a clay containing several per cent.

more alumina than is in the composition of the material that is being treated will prevent the hottest zone of the furnace from fluxing away. The dust chamber and pipes leading thereto and pipes for carrying the acid away from the same can all be made of iron, as hydrochloric acid does not attack iron, unless cooled below the boiling point of the acid, so that condensation can occur.

The process can also be carried out in the ordinary type of rotary cement furnace. In this case a mixture of clay and salt in small masses slightly agglutinated together by dampening is fed into the end of the furnace, in the proportion, say of 156 parts of clay containing about 51 parts of alumina and 112 parts of salt. This mixture is fed into the furnace with a surplus of water over and above that required to decompose the 112 parts of salt. The reaction begins as low as the melting point of salt, and is very rapid at about 1800° F, when salt vapor is formed with rapidity. When the furnace is rotated the charge reaches the hotter zones, and the salt vapors leave the small masses of clay with which the salt is mixed. The reaction goes on very fast due to the dust of clay forming in an atmosphere of vapor salt and water, and when such dust settles in the upper part of the furnace it again returns to the heated zone, most of it passing through the same along with converted material that has entered the zone of sintering, although it is best that the material should not be melted, other than being mixed with molten salt somewhat above the zone of hottest temperature. All materials caught in the dust chamber should either slide back, or be conveyed back into the rotating furnace. The high tension currents transmitted through the gases carrying the dust will cause precipitation of all suspended particles of salt, or other converted material, the hydrochloric acid formed being drawn away to a condensing system by suitable means.

In the rotary furnace the masses as they pass through the conversion zone should not be as large as hickory nuts, and preferably as small as peas.

When I have used in this specification the term "salt" I intend it in the sense of an alkali chlorid.

I do not herein claim the application of the material in small masses or in the rotary furnace, that forming the subject of my divisional application, Ser. No. 789,394, filed Sept. 11, 1913.

Having thus fully explained my invention and the manner in which it is to be carried out, what I claim, is:—

1. The method of forming alkali-silico-aluminate, which consists in subjecting finely divided clay to the action of vapor of salt and water at high temperature.

2. The method of forming alkali-silico-aluminate, which consists in subjecting aluminous compounds in finely divided condition to the action of vapor of salt and water.

3. The method of forming alkali-silico-aluminate, which consists in preparing the aluminous material so as to expose the largest extent of surface, and subjecting in a furnace the material thus prepared to the action of combustion gases and the vapors of salt and water.

4. The method of producing alkali-silico-aluminate which consists in subjecting a mixture of feldspar and aluminous material in finely divided condition to the action of vapor of salt and water.

5. The method of forming alkali-silico-aluminate, which comprises subjecting a mixture of salt and clay in the pulverulent condition to the action of vapor of water and furnace combustion gases.

6. The method of forming alkali-silico-aluminate and hydrochloric acid, which comprises feeding finely divided aluminous material and salt into a combustion furnace, precipitating the dust particles formed, conducting the hydrochloric acid to a condensing system, and separately collecting the resulting solid product.

Signed at Sewaren, in the county of Middlesex and State of New Jersey, this 10th day of December, A. D. 1912.

ALFRED HUTCHINSON COWLES.

Witnesses:
 FRANK J. PHILLIPS,
 ALBERT STETSON.